July 16, 1940.   J. J. McCANN   2,208,276
JOINT FOR ARTIFICIAL LIMBS
Filed Jan. 10, 1939
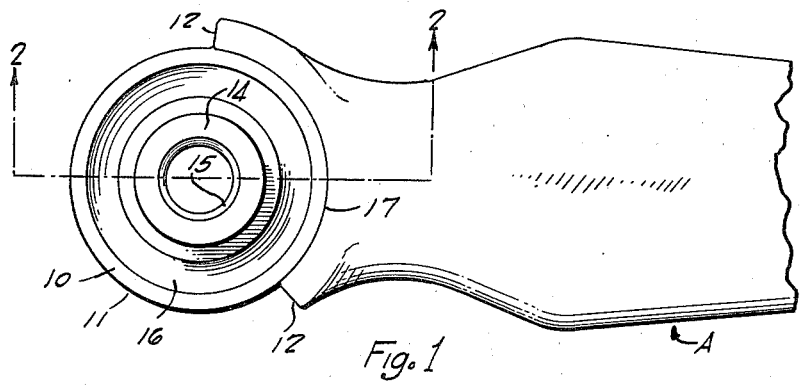
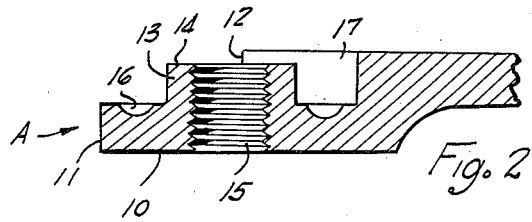
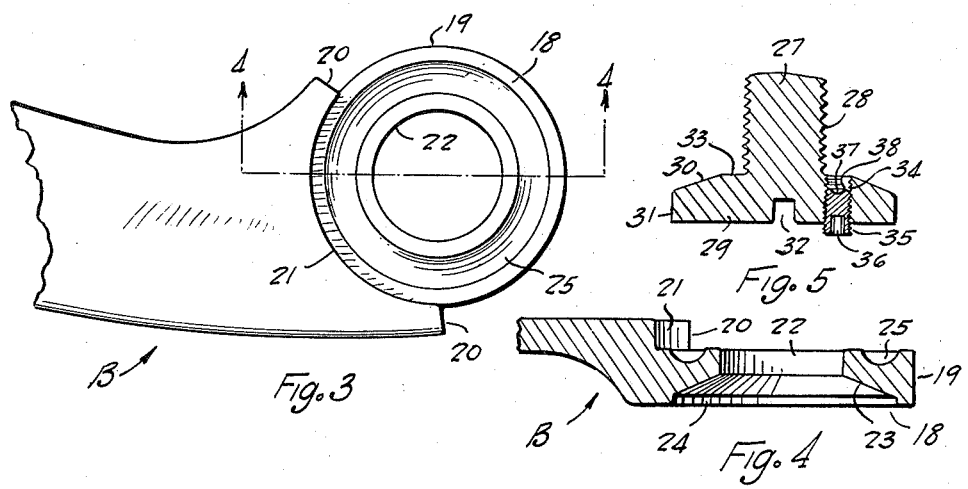
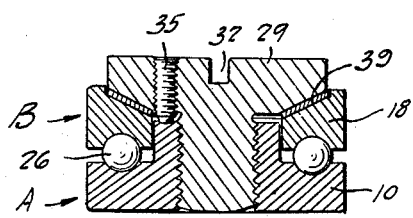
INVENTOR.
John J. McCann
BY Joshua R. H. Potts
ATTORNEY.

Patented July 16, 1940

2,208,276

UNITED STATES PATENT OFFICE 2,208,276

JOINT FOR ARTIFICIAL LIMBS

John J. McCann, Burlington, N. J.; J. Conner French, Mercer County, and John A. McCann, Burlington County, N. J., executors of John J. McCann, deceased Application January 10, 1939, Serial No. 250,083

2 Claims. (Cl. 287—101)

This invention relates to hinge joints and is concerned primarily with that type of joint employed as a knee joint in artificial limbs.

A hinge joint of the type with which this invention is concerned generally comprises a pair of complemental joint members each being formed at one end with a knuckle. The knuckle on one of the hinge members is formed with an opening, while the knuckle on the other member carries a ring-like stud which is received in the opening on the first mentioned member. The meeting faces of the two knuckles are formed with grooves which together define a ball race for receiving ball bearings. The stud on one of the knuckle members is interiorly threaded, and a screw stem is ordinarily screwed thereinto for the purpose of maintaining the assembled relationship of the joint.

In view of the particular use to which these hinge joints are put, it is important that the various parts be machined to a high degree of accuracy so as to provide good supporting effects with elimination of any looseness or play while the joint is in use. It is also extremely important to guard against the accidental disassembly of the joint which would take place were the screw stem to become loosened. Accordingly various means have been proposed in this art for the locking of the screw stem in place.

With the foregoing in mind this invention has in view, as its foremost objective, the provision of a hinge joint of the character above described which includes novel and highly simplified means for locking the screw stem in position.

More in detail this invention proposes an arrangement in which a set screw is employed as the locking means. In incorporating a set screw into the mechanism of the joint so as to provide the desired locking effects, certain conditions must be accommodated in order to achieve the desired results.

In the first place, these joints, in order to give the best results, must be adjusted with a high degree of nicety. This adjustment is obtained by the extent to which the screw stem is threaded home in the hollow stud. When exactly the correct tightness has been attained it is important that the screw stem be locked accurately in that position. Accordingly the set screw must be so assembled with the screw stem and other parts that it does not have to fit into any preformed recesses or notches, as any such condition as this would make it impossible, in many instances, to maintain the desired exact adjustment.

It is also important that the set screws be so associated with the screw stem that a radial arm of sufficient extent be present to afford the required locking effects.

With these conditions in mind the invention has in view, as a further object, the provision of a hinge joint of the character above noted, in which the hollow stud is so dimensioned as to provide an upper surface into which a set screw is adapted to bite. The set screw is carried by the head of the stem at a point intermediate the axis of the stem and its periphery.

Another particular object of the invention is the provision of a hinge joint of the character above noted which includes a set screw in the manner set forth, and which set screw is of a type particularly suited to accomplish the desired results. In order to assure good locking effects it is desirable that the end of the set screw which engages the ring-like upper face of the hollow stud be peculiarly adapted to bite thereinto and yet not seriously mar the surface. Accordingly the lower end of the set screw is formed with a cup-shaped recess, leaving a ring-like edge which is adapted to bite into the upper face of the hollow stud.

In view of the desirability for maintaining the outer surface of the joint flush, and also to guard against accidental displacement of the set screw, the means for rotating the same preferably takes the form of a non-circular recess that is formed in the upper or outer end thereof. This recess is adapted to receive wrench engaging means which may be employed to tighten or loosen the set screw. After the set screw has assumed its tightened locked position it is desirable that the extremity thereof lie flush or beneath the head of the stem.

Various other more detailed objects and advantages of the invention will in part become apparent, and in part be hereinafter stated, as the description of the invention proceeds.

The invention, therefore, comprises a hinge joint including a pair of hinge members each carrying at one end a pair of knuckles that are complemental to one another. One of the knuckles is formed with an opening which receives a hollow stud extending upwardly from the other knuckle. The meeting faces of the knuckles are grooved to provide a ball race which carries bearing elements. The hollow stud is interiorly threaded, and screwed thereinto is a screw stem having a head which engages the knuckle formed with the opening therein to maintain the desired assembled relationship. This head of the screw stem carries a set screw of a type particularly designed for this specific use, and which set screw engages the ring-like upper end of the hollow stud to lock the screw stem in position with respect thereto.

For a full and more complete understanding of the invention reference may be had to the following description and accompanying drawing, wherein:

Figure 1 is a plan view of one member of the hinge joint of this invention,

Figure 2 is a sectional showing taken about on the plane represented by the line 2—2 of Figure 1, Figure 3 is a plan view of the other joint member, while Figure 4 is a section taken about on the plane represented by the line 4—4 of Figure 3, Figure 5 is a sectional view through the screw stem per se bringing out the manner in which the set screw is carried thereby, and Figure 6 is a sectional view through the assembled joint.

Referring now to the drawing, wherein like reference characters denote corresponding parts, the improved joint of this invention is shown as comprising the hinge joint members which are referred to in their entirety by the reference characters A and B, the joint member A being shown in detail in Figures 1 and 2, while the joint member B is brought out in Figures 3 and 4.

Referring now more particularly to Figures 1 and 2, the joint member A is shown as carrying, at one end, a knuckle designated 10. This knuckle 10 is formed integrally with the member A and has an outer cylindrically shaped wall 11 that terminates at shoulders 12, which are continued up above the wall 11. A hollow stud of ring-like formation is carried by the knuckle 10, as designated at 13. This stud is of appreciable thickness and has an upper ring-like surface 14. This stud 13 is interiorly threaded, as shown at 15, and the threaded bore continued through the knuckle 10.

Intermediate the stud 13 and the outer wall 11 the knuckle 10 is formed with a groove 16 designed to constitute a part of a ball race. Between the shoulders 12 the joint member A is formed with a section of a cylindrical surface which is designated 17. This cylindrical surface 17 has substantially the same curvature and center as the cylindrical wall 11.

Referring now more particularly to Figures 3 and 4, the joint member B is shown as carrying a knuckle 18 at its free end, and this knuckle 18 is complemental to the knuckle 10. The member 18 has an outer cylindrical wall 19 that terminates at shoulders 20, and between the shoulders 20 the joint member B is formed with a curved wall 21 having substantially the same curvature and center as the wall 19.

The knuckle 18 is formed with a cylindrical bore 22 that is designed to snugly receive the stud 13. This bore 22 is flared at one end to provide a truncated conical surface 23 that terminates in a small ring-like cylindrical wall 24. Intermediate the bore 22 and the outer cylindrical wall 19 the knuckle 18 is formed with a groove 25 that is complemental to the groove 16 in the knuckle 10 and cooperates therewith to define a ball race.

When the knuckles 10 and 18 are assembled, the stud 13 is snugly received in the bore 22. The grooves 16 and 25 define a ball race, and it is notable that the cylindrical surface 11 on the knuckle 10 engages the cylindrical wall 21 on the joint member B, and conversely the cylindrical wall 19 on the knuckle 18 engages the wall 17 on the joint member A. Relative pivotal movement between the two members is limited by the shoulders 12 and 20.

Prior to assembly of the joint, bearing elements, such as the ball bearings shown at 26, are placed in the ball race defined by the grooves 16 and 25.

Referring, for the moment, more particularly to Figure 5, a screw stem is designated 27 and is exteriorly threaded, as shown at 28. This stem has a head 29 formed at the outer portion of its underface with a truncated conical surface 30 that is complemental to the truncated conical surface 23 on the knuckle 18. The head 29 has an outer cylindrical surface 31 which is designed to be snugly received within the ring-like cylindrical surface 24 of the knuckle 18. The head 29 is also formed with tool engaging means such as the slot shown at 32.

It is notable that intermediate the conical surface 30 and the threads 28 there is a flat ring-like surface 33, and an opening extends from this surface 33 through the head 29 to the outer flat face thereof. This opening is threaded, and is designated 34. A set screw 35 of a type designed to meet the particular conditions of use is threaded into this opening 34. The set screw 35, at its outer or free end, is formed with a non-circular recess 36 which is designed to constitute a wrench engaging means. The inner end of this set screw 36 is formed with a cup-like recess 37 that defines a ring-like biting edge 38.

Referring now to Figure 6, it will be noted that with the knuckles 10 and 18 assembled in the manner aforesaid, and with the bearing elements 26 in position, the screw stem 27 may be screwed into the threaded opening 15.

A thrust bearing designated 39, and preferably of a non-metallic material such as Celluloid, is carried on the conical surface 23, and the screw stem 27 is threaded down until the conical surface 30 engages this thrust bearing 39. When a desired degree of tightness is obtained a wrench of appropriate design is inserted in the recess 36 and the set screw 35 tightened until the ring-like edge 38 bites into the face 14 to set up the required lock.

It is obvious that with this arrangement the screw stem 27 is maintained in locked relationship with respect to the stud 13 to maintain the joint assembled at a desired adjustment. This is particularly important because the screw stem may be so tightened as to completely eliminate any looseness or play, and the condition maintained by the locking effects.

Moreover, the particular type of locking means cannot in any way affect or disturb the nicety of the fit between the knuckles. These parts are machined with a high degree of accuracy, and it is important that this accuracy remain undisturbed by the locking means, otherwise there would be a tendency for the joint to bind.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

I claim:

1. A hinge joint of the character described comprising a pair of joint members, each joint member carrying at one end a knuckle, the knuckles on said joint members being complemental, one of said knuckles being formed with an opening, the other knuckle being formed with a hollow stud that is received in said opening, said stud having an interiorly threaded surface, a screw stem threaded into the stud and having a head, and a set screw carried by said head and having an end adapted to engage the said stud to lock the screw stem in adjusted position.

2. A hinge joint of the character described comprising a pair of joint members, each joint member carrying at one end a knuckle, the knuckles on said joint members being complemental, one of said knuckles being formed with an opening, the other knuckle being formed with a hollow stud that is received in said opening, said stud having a threaded bore and presenting an upper flat ring-like surface, a screw stem threaded into said bore and having a head, and a set screw carried by said head, said set screw having an end designed to bite into the flat ring-like surface of the stud to maintain the stem in locked relationship with respect thereto.

JOHN J. McCANN.